United States Patent
Katayose

(10) Patent No.: US 10,838,201 B2
(45) Date of Patent: Nov. 17, 2020

(54) OPTICAL SYSTEM AND IMAGE PICKUP APPARATUS

(71) Applicant: CANON KABUSHIKI KAISHA, Tokyo (JP)

(72) Inventor: Masato Katayose, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 50 days.

(21) Appl. No.: 16/158,413

(22) Filed: Oct. 12, 2018

(65) Prior Publication Data

US 2019/0113721 A1  Apr. 18, 2019

(30) Foreign Application Priority Data

Oct. 16, 2017 (JP) ................. 2017-200166

(51) Int. Cl.
  *G02B 27/00* (2006.01)
  *G02B 15/177* (2006.01)
  *G02B 15/20* (2006.01)

(52) U.S. Cl.
  CPC ....... *G02B 27/0062* (2013.01); *G02B 15/177* (2013.01); *G02B 15/20* (2013.01)

(58) Field of Classification Search
  CPC .. G02B 15/177; G02B 15/20; G02B 27/0062; H04N 5/23212
  See application file for complete search history.

(56) References Cited

U.S. PATENT DOCUMENTS

2018/0372993 A1   12/2018   Katayose

FOREIGN PATENT DOCUMENTS

| JP | 2013178365 A | 9/2013 |
|----|--------------|--------|
| JP | 2013218015 A | 10/2013 |
| JP | 2015200845 A | 11/2015 |
| JP | 2016061903 A | 4/2016 |
| JP | 2016061919 A | 4/2016 |

OTHER PUBLICATIONS

Tomohiko, "Optical System and Imaging Apparatus Using the Same", JP 2013218015, machine translation (Year: 2013).*
Notice of Reasons for Refusal issued by the Japan Patent Office on Jun. 2, 2020 in corresponding JP Patent Application No. 2017-200166, with English translation.

* cited by examiner

*Primary Examiner* — Wen Huang
(74) *Attorney, Agent, or Firm* — Carter, DeLuca & Farrell LLP

(57) ABSTRACT

An optical system of this invention includes a first lens unit having a positive refractive power that is moved to an object side for focusing from infinity to a close distance. The first lens unit consists of, in order from the object side to an image side, a first lens sub-unit, an aperture stop, and a second lens sub-unit including a positive lens. A positive lens made of a material having an extraordinary dispersion characteristic $\Delta\theta gF$ which is largest among the positive lenses included in the second lens sub-unit is represented by positive lens Lp. An extraordinary dispersion characteristic of the material of the positive lens Lp, a focal length of the positive lens Lp, a focal length of the first lens unit, a focal length of the first lens sub-unit, and a focal length f1b of the second lens sub-unit are each appropriately set.

15 Claims, 9 Drawing Sheets

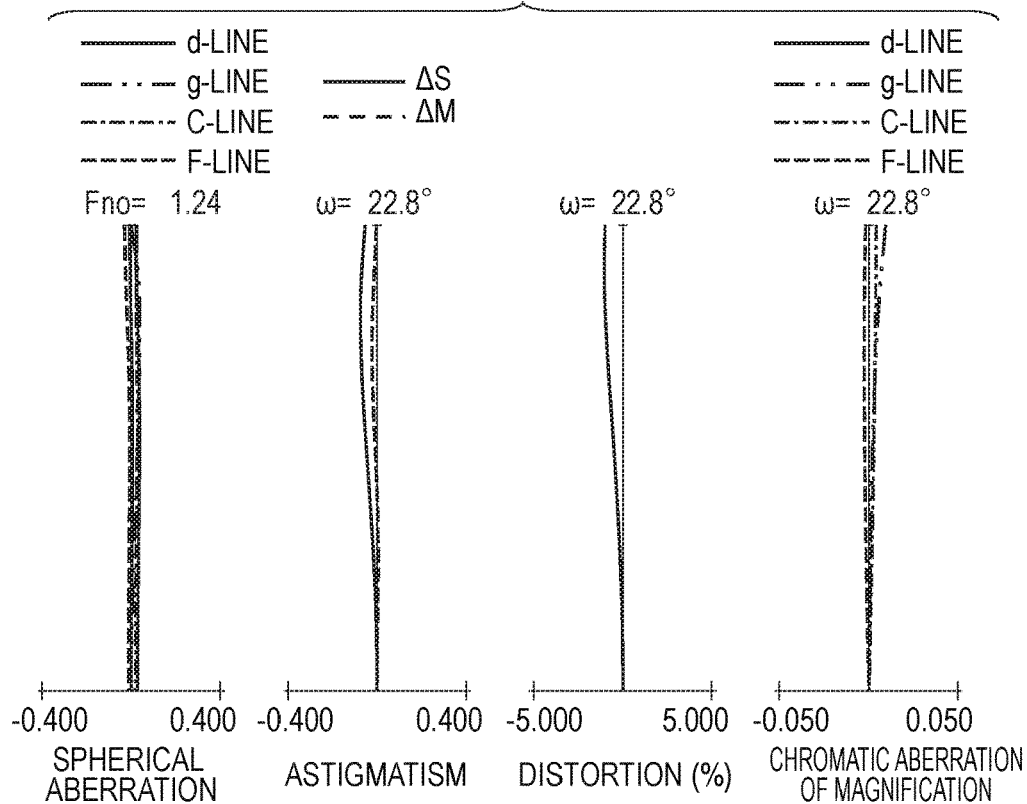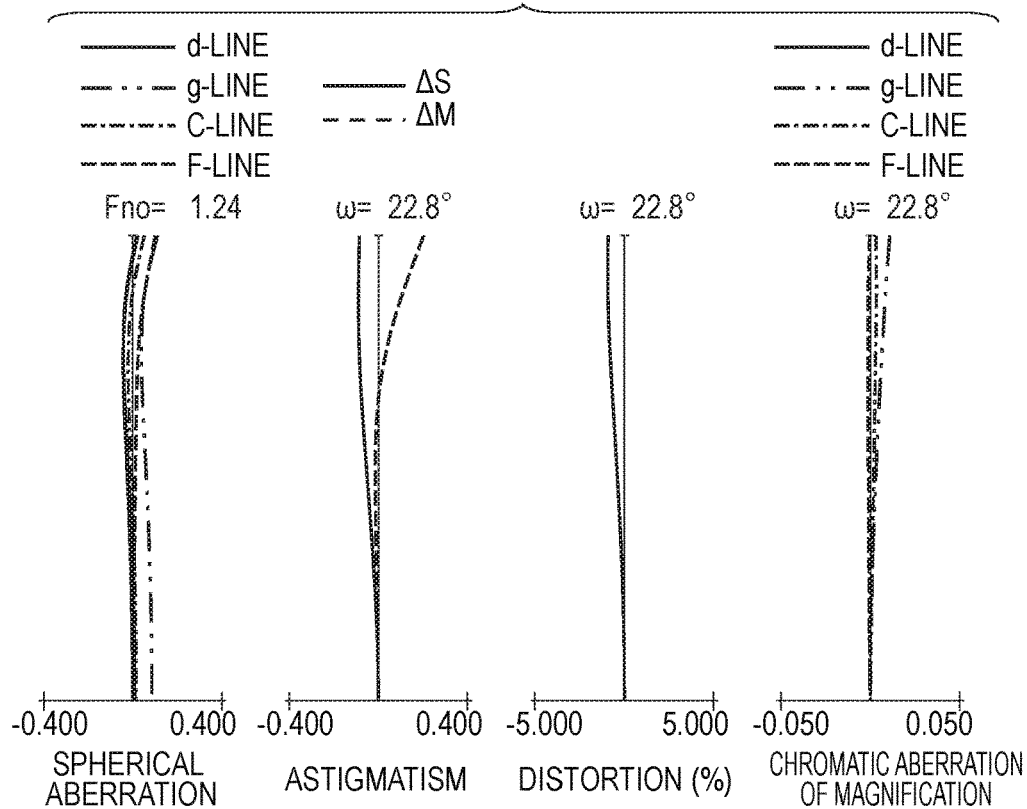

OPTICAL SYSTEM AND IMAGE PICKUP APPARATUS

BACKGROUND OF THE INVENTION

Field of the Invention

The present invention relates to an optical system, and more particularly is suitable as an image pickup optical system of an image pickup apparatus such as a single-lens reflex camera, a digital still camera, a TV camera, a video camera or a monitoring camera.

Description of the Related Art

For image pickup optical systems that are used in image pickup apparatuses which use an image pickup element, in addition to a demand to enhance image quality (achieve a high resolution), there is also a demand for a bokeh effect in an image to be favorable. An image pickup optical system having a high aperture ratio is known as an image pickup optical system that satisfies these demands. For image pickup optical systems having a higher aperture ratio, since the depth of field is shallow, there is a desire to favorably correct aberrations including chromatic aberration in order to make a bokeh effect look beautiful while enhancing the image quality.

Various image pickup optical systems that have a high aperture ratio which are configured to favorably correct aberrations including chromatic aberration have already been proposed (Japanese Patent Application Laid-Open No. 2013-218015 and Japanese Patent Application Laid-Open No. 2015-200845).

Japanese Patent Application Laid-Open No. 2013-218015 discloses an optical system consisting of a first lens unit having a positive refractive power and a second lens unit having a positive or negative refractive power which are arranged in that order from an object side to an image side, in which the first lens unit is moved for focusing.

Japanese Patent Application Laid-Open No. 2015-200845 discloses an optical system consisting of a front unit having a positive or negative refractive power, an aperture stop, and a rear unit having a positive refractive power which are arranged in that order from an object side to an image side. In Japanese Patent Application Laid-Open No. 2015-200845, the front unit consists of a first lens unit having a positive or negative refractive power and a second lens unit having a positive refractive power, and the rear unit consists of a third lens unit having a positive refractive power. The second lens unit and the third lens unit are moved for focusing.

In an optical system having a high aperture ratio, because the depth of field becomes shallow, the influence that aberrations such as axial chromatic aberration, chromatic aberration of magnification, spherical aberration, comatic aberration or astigmatism have on image quality increases. In an optical system having a high aperture ratio, in order to favorably correct aberrations such as spherical aberration, comatic aberration and astigmatism while reducing the overall size, it is effective to use a material having a high refractive index and comparatively low dispersion for a positive lens included in a first lens unit having a positive refractive power.

However, in a material having a high refractive index and low dispersion, an extraordinary dispersion characteristic is generally low. Therefore, correction of the secondary spectrum of axial chromatic aberration is difficult, and correcting axial chromatic aberration in a well-balanced manner becomes difficult. In particular, if axial chromatic aberration that arises in a focusing unit that is moved for focusing is not adequately corrected, variations in axial chromatic aberration caused by focusing increase and it is difficult to achieve enhanced image quality over the entire object distance from infinity to a close distance.

To achieve enhanced image quality over the entire object distance from infinity to a close distance it is necessary to correct aberrations such as axial chromatic aberration, chromatic aberration of magnification, spherical aberration, comatic aberration and astigmatism in a well-balanced manner. In order to do so, it is important to appropriately set the refractive power and the like of each lens unit and the material of lenses included in a focusing unit.

SUMMARY OF THE INVENTION

The optical system of the present invention is an optical system including a first lens unit having a positive refractive power that is moved to an object side for focusing from infinity to a close distance, wherein:

the first lens unit consists of, in order from the object side to an image side, a first lens sub-unit, an aperture stop, and a second lens sub-unit including one or more positive lenses; and the following conditional expressions are satisfied:

$$0.0 < \Delta\theta gFLp,$$

$$0.4 < fLp/f1 < 1.2, \text{ and}$$

$$0.15 < f1b/f1a < 0.60$$

where $\Delta\theta gFLp$ is an extraordinary dispersion characteristic of the material of a positive lens Lp, the positive lens LP being included in the one or more positive lenses included in the second lens sub-unit, the positive lens LP being made of a material having the largest extraordinary dispersion characteristic among extraordinary dispersion characteristics of materials of the one or more positive lenses included in the second lens sub-unit, $fLp$ is a focal length of the positive lens Lp, $f1$ is a focal length of the first lens unit, $f1a$ is a focal length of the first lens sub-unit, $f1b$ is a focal length of the second lens sub-unit, and $bf$ is a back focus when focusing at infinity.

Further features of the present invention will become apparent from the following description of exemplary embodiments with reference to the attached drawings.

BRIEF DESCRIPTION OF THE DRAWINGS

FIG. 2A is an aberration graph when focused at infinity of the optical system of Embodiment 1.

FIG. 2B is an aberration graph when focused at the minimum object distance of the optical system of Embodiment 1.

DESCRIPTION OF THE EMBODIMENTS

Preferred embodiments of the present invention will now be described in detail in accordance with the accompanying drawings.

Hereunder, exemplary embodiments of the optical system and the image pickup apparatus will be described using the accompanying drawings.

The optical system of the exemplary embodiments includes a first lens unit having a positive refractive power that is moved to the object side for focusing from infinity to a close distance. The first lens unit consists of a first lens sub-unit, an aperture stop, and a second lens sub-unit including one or more positive lenses, that are arranged in that order from the object side to the image side.

Figure 1:
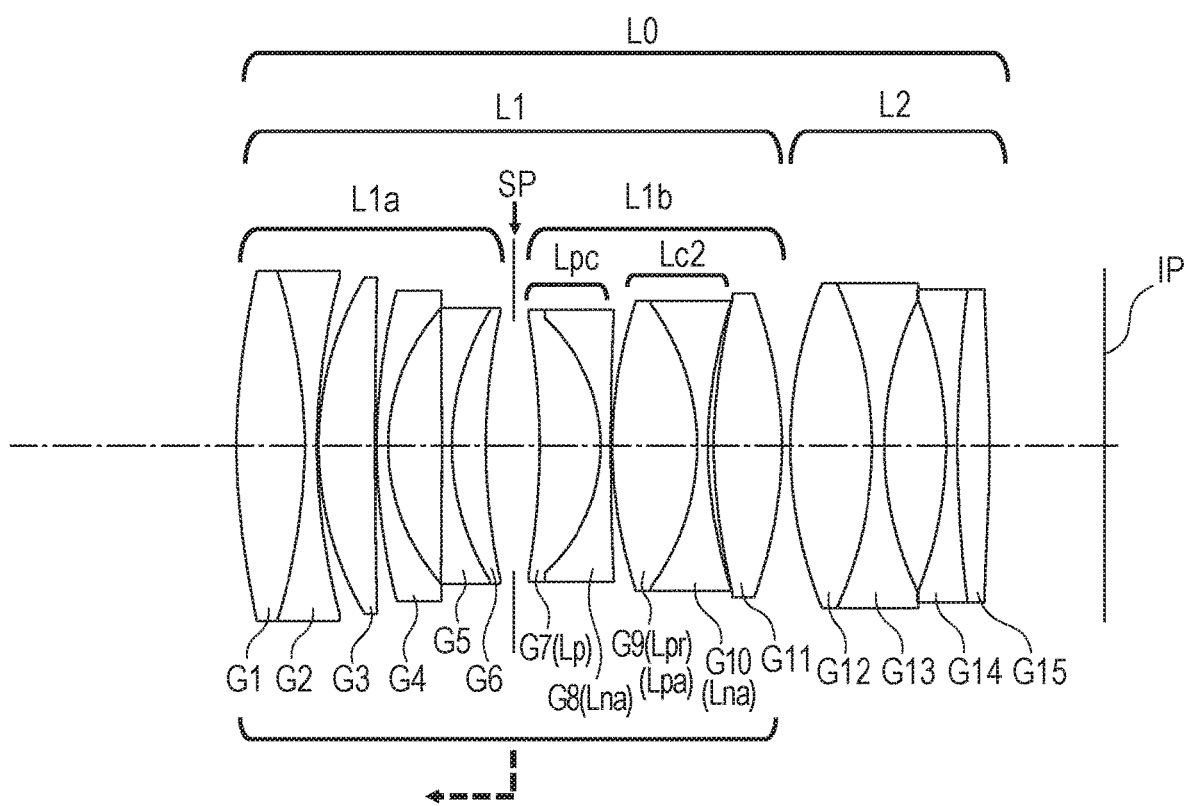
FIG. 1 is a cross-sectional view of lenses of an optical system of Embodiment 1.

FIG. 1 is a cross-sectional view of lenses of an optical system of Embodiment 1. FIGS. 2A and 2B are aberration graphs at a time when the optical system of Embodiment 1 is focused at infinity and focused at the minimum object distance, respectively. In the optical system of Embodiment 1, the F-number is 1.24 and the image pickup angle of view is 45.58 degrees.

Figure 3:
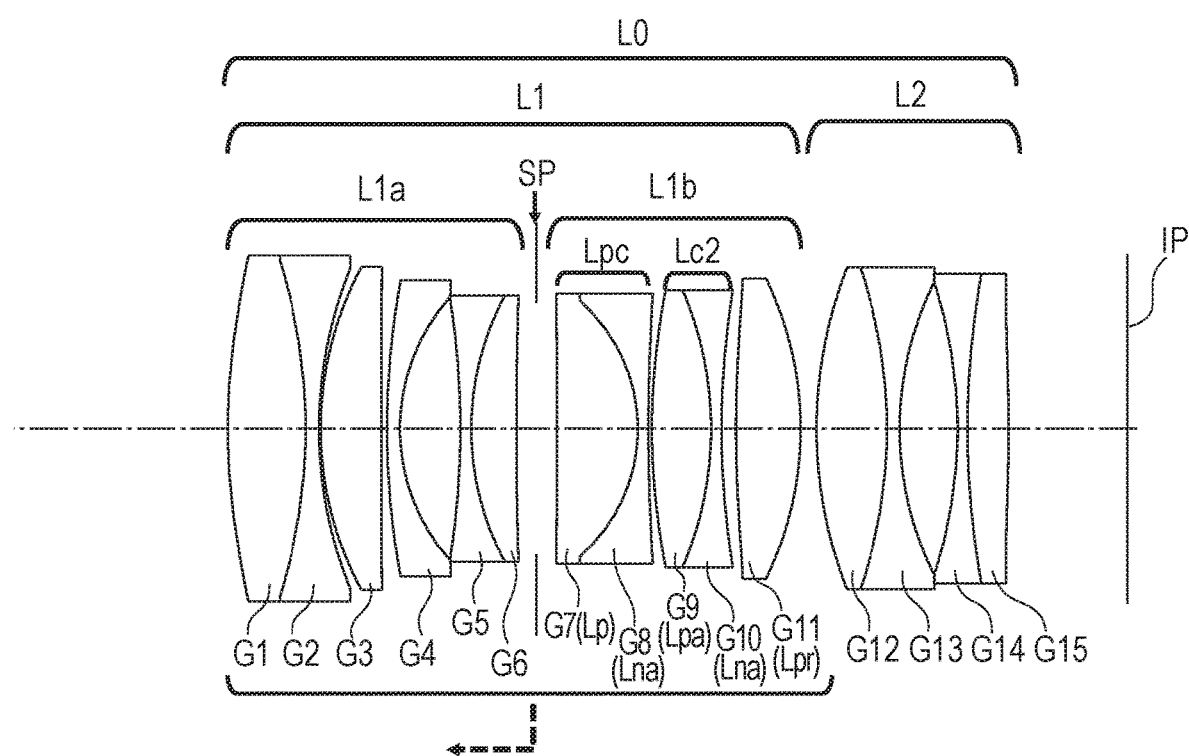
FIG. 3 is a cross-sectional view of lenses of an optical system of Embodiment 2.
Figure 4A:
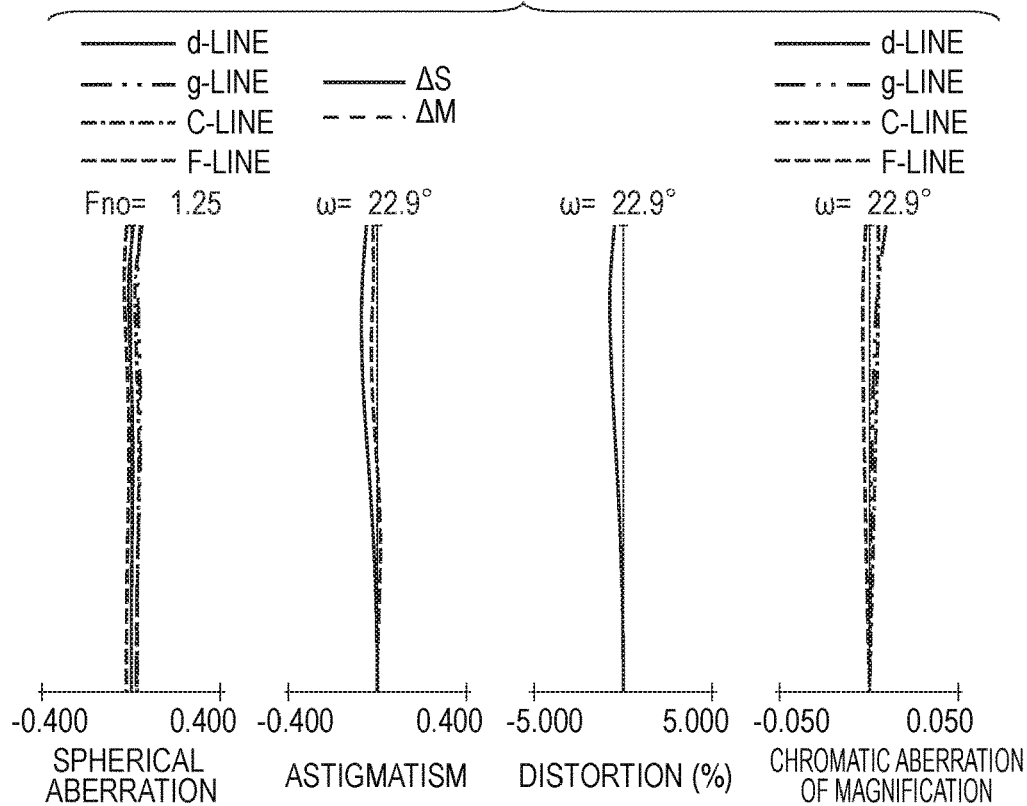
FIG. 4A is an aberration graph when focused at infinity of the optical system of Embodiment 2.
Figure 4B:
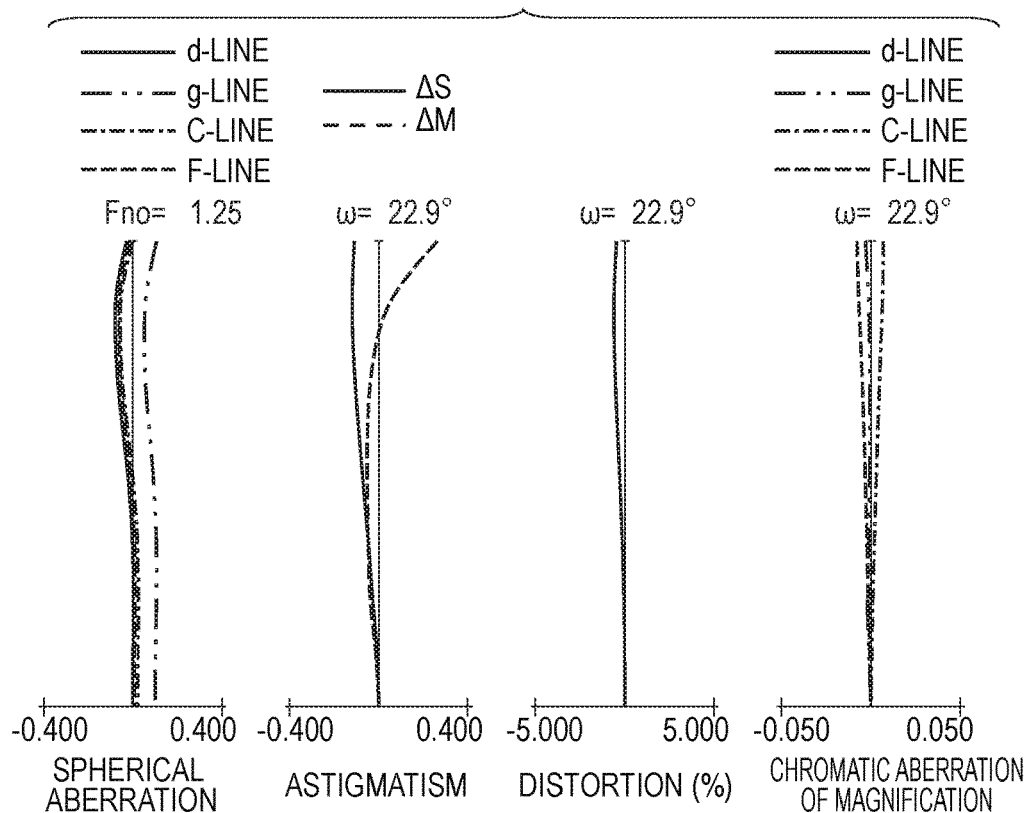
FIG. 4B is an aberration graph when focused at the minimum object distance of the optical system of Embodiment 2.

FIG. 3 is a cross-sectional view of lenses of an optical system of Embodiment 2. FIGS. 4A and 4B are aberration graphs at a time when the optical system of Embodiment 2 is focused at infinity and focused at the minimum object distance, respectively. In the optical system of Embodiment 2, the F-number is 1.25 and the image pickup angle of view is 45.9 degrees.

Figure 5:
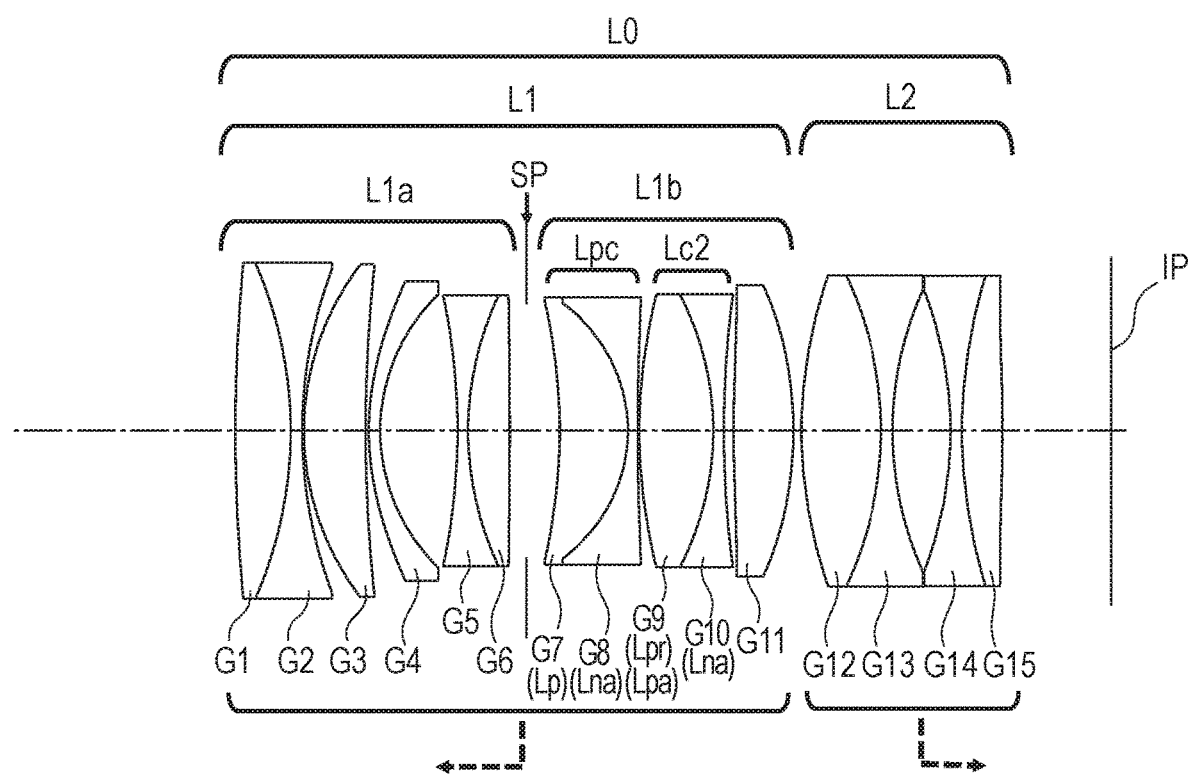
FIG. 5 is a cross-sectional view of lenses of an optical system of Embodiment 3.
Figure 6A:
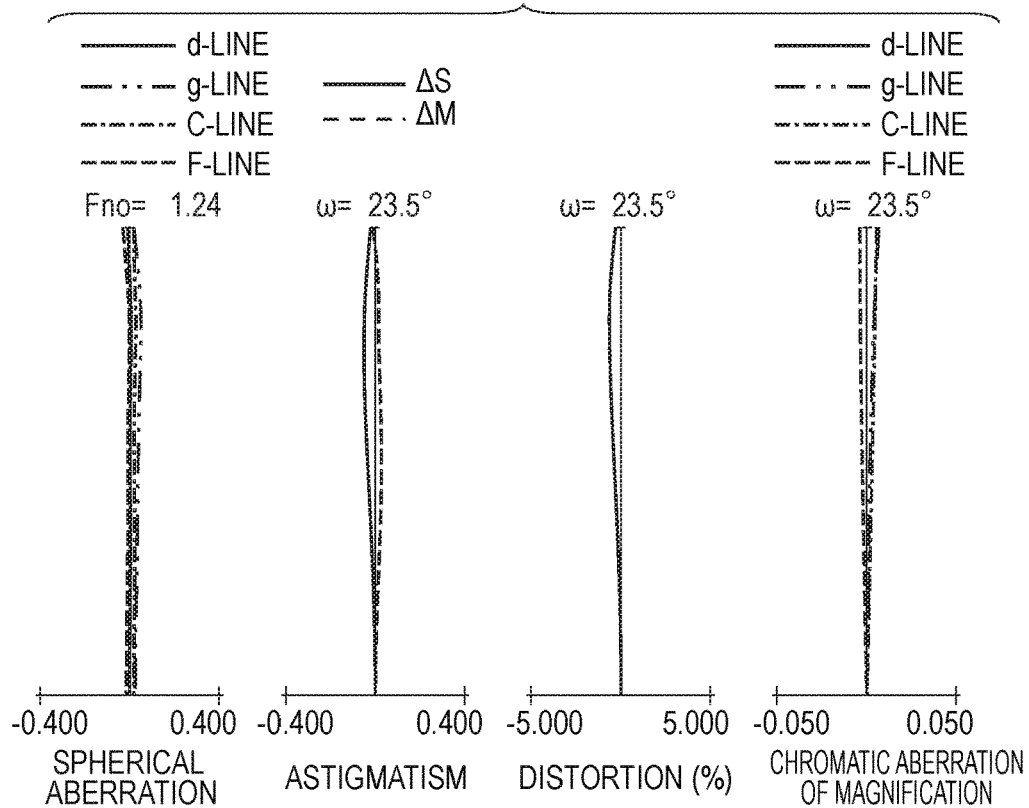
FIG. 6A is an aberration graph when focused at infinity of the optical system of Embodiment 3.
Figure 6B:
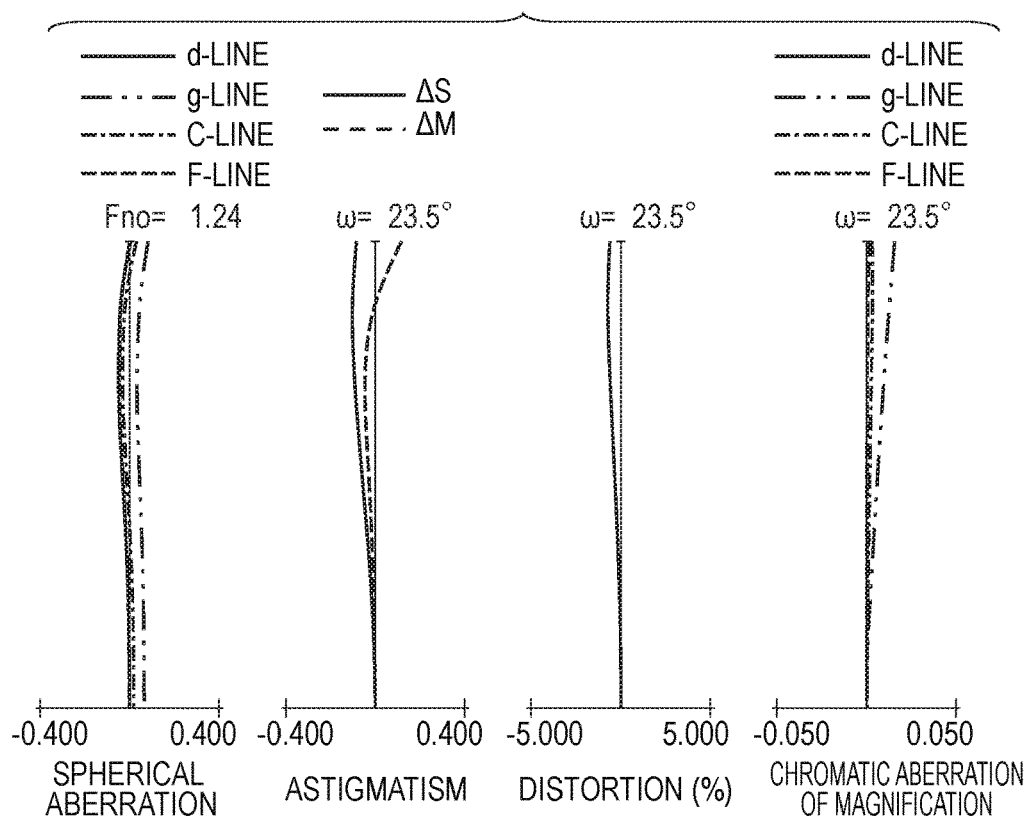
FIG. 6B is an aberration graph when focused at the minimum object distance of the optical system of Embodiment 3.

FIG. 5 is a cross-sectional view of lenses of an optical system of Embodiment 3. FIGS. 6A and 6B are aberration graphs at a time when the optical system of Embodiment 3 is focused at infinity and focused at the minimum object distance, respectively. In the optical system of Embodiment 3, the F-number is 1.24 and the image pickup angle of view is 47.08 degrees.

Figure 7:
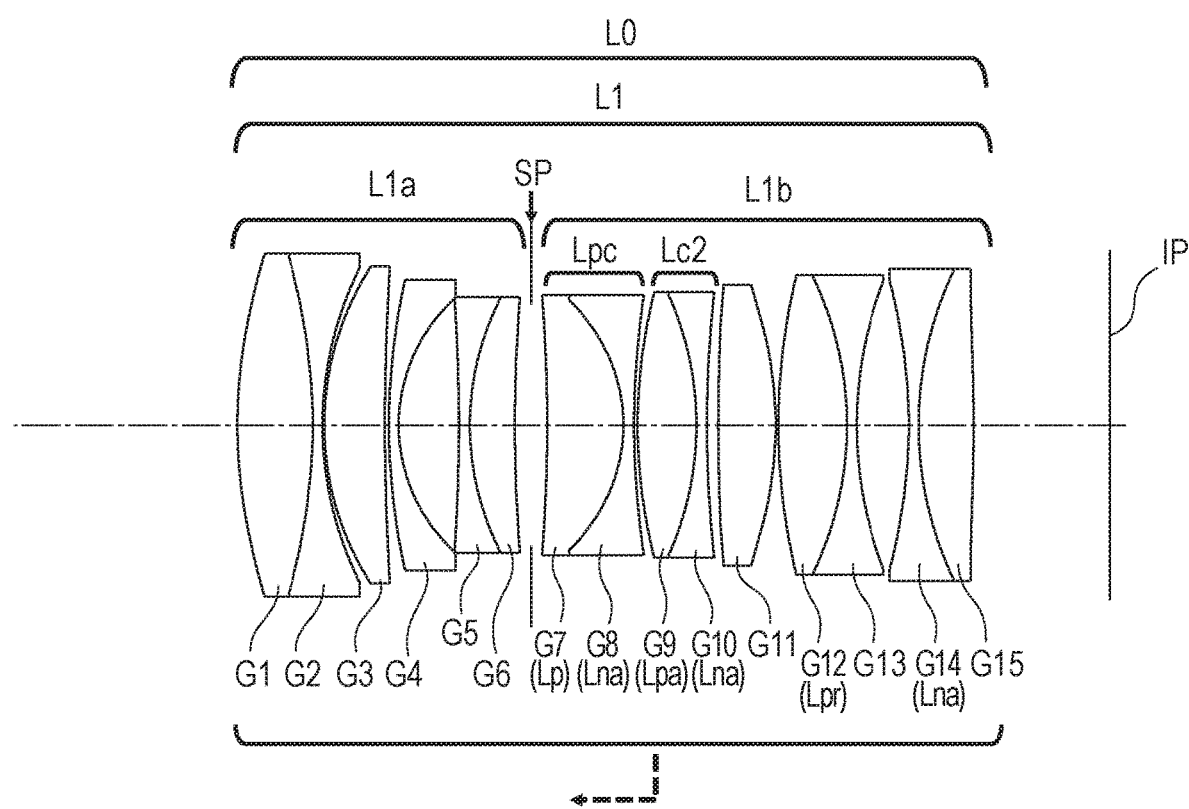
FIG. 7 is a cross-sectional view of lenses of an optical system of Embodiment 4.
Figure 8A:
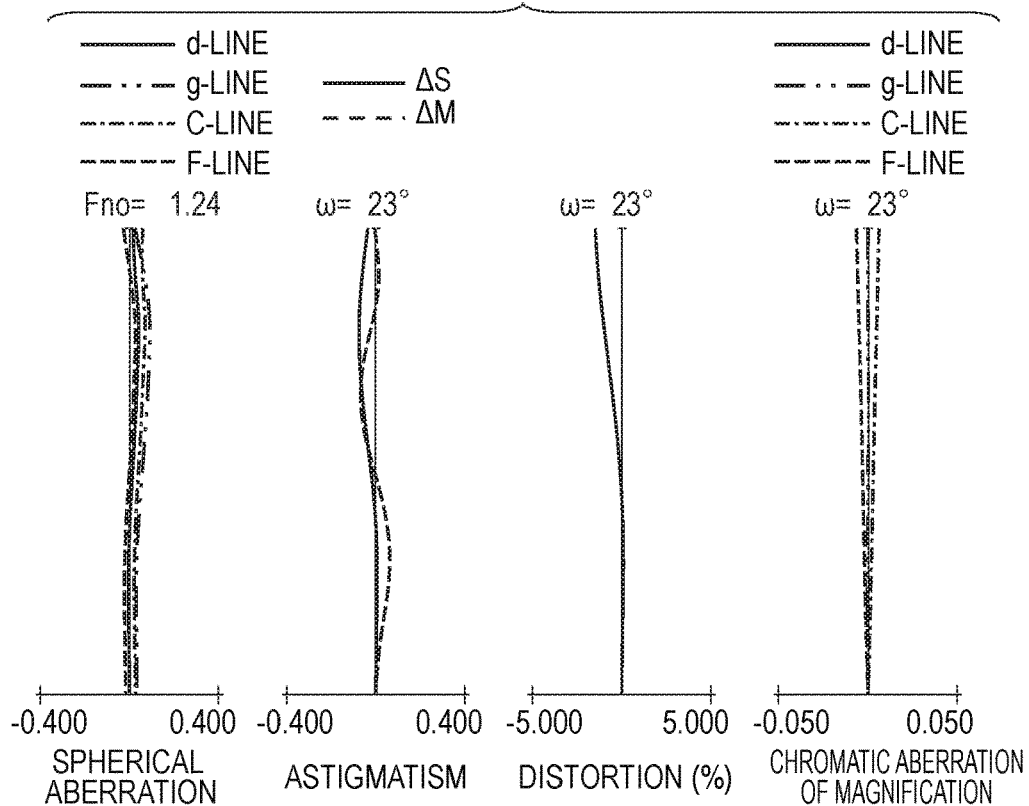
FIG. 8A is an aberration graph when focused at infinity of the optical system of Embodiment 4.
Figure 8B:
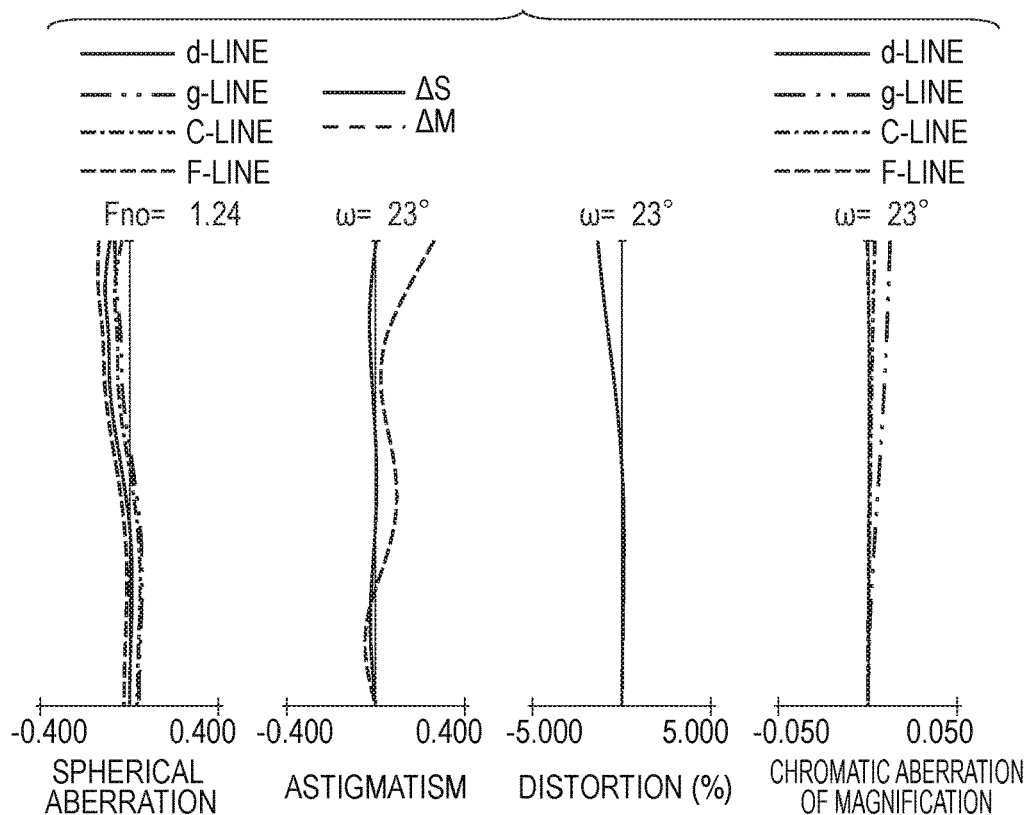
FIG. 8B is an aberration graph when focused at the minimum object distance of the optical system of Embodiment 4.

FIG. 7 is a cross-sectional view of lenses of an optical system of Embodiment 4. FIGS. 8A and 8B are aberration graphs at a time when the optical system of Embodiment 4 is focused at infinity and focused at the minimum object distance, respectively. In the optical system of Embodiment 4, the F-number is 1.24 and the image pickup angle of view is 45.9 degrees.

Figure 9:
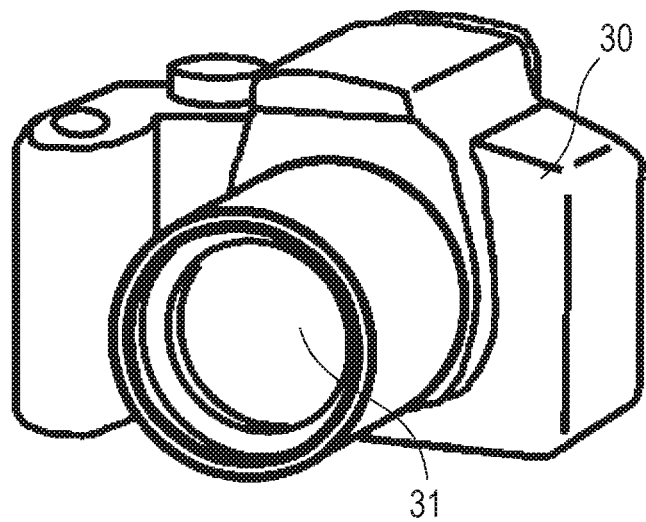
FIG. 9 is a schematic view of main portions of an image pickup apparatus of the present invention.

FIG. 9 is a schematic view of main portions of an image pickup apparatus.

The optical system of each embodiment is an image pickup optical system that is used in an image pickup apparatus such as a video camera, a digital camera, a TV camera or a monitoring camera. In each cross-sectional view of lenses, the left side is the subject side (object side) (front), and the right side is the image side (rear). In each cross-sectional view of lenses, reference character L0 denotes an optical system. i represents the order of the relevant lens unit from the object side, and Li represents an i-th lens unit.

In the cross-sectional view of lenses of Embodiments 1 to 3, reference character L1 denotes a first lens unit that has a positive refractive power, and reference character L2 denotes a second lens unit that has a positive refractive power. The first lens unit L1 consists of a first lens sub-unit L1$a$ having a positive refractive power, an aperture stop SP, and a second lens sub-unit L1$b$ having a positive refractive power, which are arranged in that order from the object side to the image side. The optical system L0 of Embodiments 1 to 3 is an optical system consisting of two lens units.

In the cross-sectional view of lenses of Embodiment 4, reference character L1 denotes a first lens unit that has a positive refractive power. The first lens unit L1 consists of a first lens sub-unit L1$a$ having a positive refractive power, an aperture stop SP, and a second lens sub-unit L1$b$ having a positive refractive power that are arranged in that order from the object side to the image side. Embodiment 4 is an optical system consisting of one lens unit.

In each cross-sectional view of lenses, reference character IP denotes an image plane, which is the position at which an image pickup surface of an image pickup element (photo-electrical conversion element) such as a CCD sensor or a CMOS sensor is placed when the optical system is used as an image pickup optical system of a video camera or a digital still camera.

In the aberration graphs, reference characters d, g, C and F denote a d-line (wavelength of 587.6 nm), a g-line (wavelength of 435.8 nm), a C-line (wavelength of 656.3 nm) and an F-line (wavelength of 486.1 nm), respectively. The symbols ΔM and ΔS denote the meridional image plane of the d-line and the sagittal image plane of the d-line, respectively. Further, distortion is represented by the d-line. Furthermore, ω represents the half angle of view (value of one-half of the image pickup angle of view) (degrees), and Fno represents the F-number.

Embodiments 1 to 3 include the second lens unit L2 that has a positive refractive power which is disposed adjacent to the image side of the first lens unit L1. In Embodiments 1 and 2, for focusing from infinity to a close distance, the first lens unit L1 is moved to the object side as indicated by a broken-line arrow. The second lens unit L2 is immobile.

In Embodiment 3, focusing is performed by independently moving each of the first lens unit L1 and the second lens unit L2 in the optical axis direction. For focusing from infinity to a close distance, the first lens unit L1 is moved to the object side as indicated by the broken-line arrow, and the second lens unit L2 is moved to the image side. In Embodiment 4, for focusing from infinity to a close distance, the first lens unit L1 is moved to the object side as indicated by the broken-line arrow.

Each embodiment includes the first lens unit L1 having a positive refractive power that is moved to the object side for focusing from infinity to a close distance. The first lens unit consists of a first lens sub-unit L1$a$, an aperture stop SP, and a second lens sub-unit L1$b$ having one or more positive lenses, which are arranged in that order from the object side to the image side.

Here, a positive lens that is made of a material having an extraordinary dispersion characteristic $\Delta\theta gF$ that is largest among the positive lenses included in the second lens sub-unit L1$b$ will be represented by positive lens Lp, an extraordinary dispersion characteristic of the material of the positive lens Lp will be represented by $\Delta\theta gFLp$, and the focal length of the positive lens Lp will be represented by fLp. Further, the focal length of the first lens unit L1 will be represented by f1, the focal length of the first lens sub-unit L1a will be represented by f1a, and the focal length of the second lens sub-unit L1b will be represented by f1b.

In this case, the following conditional expressions are satisfied:

$$0.0 < \Delta\theta gFLp \qquad (1)$$

$$0.4 < fLp/f1 < 1.2 \qquad (2)$$

$$0.15 < f1b/f1a < 0.60 \qquad (3).$$

In this case, when the refractive indexes of the material with respect to the g-line (wavelength of 435.8 nm), F-line (486.1 nm), C-line (656.3 nm) and d-line (587.6 nm) are represented by Ng, NF, NC and Nd, respectively, the Abbe number νd and the partial dispersion ratio θgF of the material are represented by the following equations.

$$\nu d = (Nd-1)/(NF-NC)$$

$$\theta gF = (Ng-NF)/(NF-NC)$$

Further, the extraordinary dispersion characteristic $\Delta\theta gF$ is defined by the following conditional expression.

$$\Delta\theta gF = \theta gF + 0.001618 \times \nu d - 0.6415$$

Next, the technical meaning of each of the foregoing conditional expressions will be described.

The conditional expression (1) appropriately defines an extraordinary dispersion characteristic of the positive lens Lp included in the second lens sub-unit L1b in order to satisfactorily correct axial chromatic aberration and chromatic aberration of magnification that arise in the first lens unit L1 that has a positive refractive power.

In order to satisfactorily correct axial chromatic aberration, it is necessary to make the secondary spectrum of the axial chromatic aberration as small as possible. In each of the exemplary embodiments, in order to correct the secondary spectrum of axial chromatic aberration of the first lens unit L1 that has a positive refractive power, a material having a high extraordinary dispersion characteristic is used for the positive lens Lp. Further, the secondary spectrum of chromatic aberration of magnification is also satisfactorily corrected by disposing the positive lens Lp which is made using a material having a high extraordinary dispersion characteristic on the image side relative to the aperture stop SP.

By using a material having an extraordinary dispersion characteristic that is greater than the lower limit value of the conditional expression (1) in the positive lens Lp included in the second lens sub-unit L1b, the secondary spectra of axial chromatic aberration and chromatic aberration of magnification are satisfactorily corrected.

The conditional expression (2) appropriately defines a ratio between the focal length of the positive lens Lp and the focal length of the first lens unit L1 having a positive refractive power in order to satisfactorily correct aberrations that include chromatic aberration that arise in the first lens unit L1 that has a positive refractive power. If the focal length of the positive lens Lp is long to an extent such that the focal length exceeds the upper limit of the conditional expression (2), because the effect of correcting the secondary spectra of axial chromatic aberration and chromatic aberration of magnification decreases, it becomes difficult to satisfactorily correct axial chromatic aberration and chromatic aberration of magnification.

If the focal length of the positive lens Lp is short to an extent such that the focal length is less than the lower limit of the conditional expression (2), because the curvature radius of each lens surface of the positive lens Lp will be too small, the occurrence of aberrations such as spherical aberration, comatic aberration and astigmatism will decrease, and correction of aberrations will be difficult.

The conditional expression (3) appropriately defines a ratio between the focal length of the first lens sub-unit L1a and the focal length of the second lens sub-unit L1b in order to satisfactorily correct aberrations that include chromatic aberration that arise in the first lens unit L1 that has a positive refractive power.

In each exemplary embodiment, in a case where a material having a high extraordinary dispersion characteristic is used in a positive lens in the first lens sub-unit L1a having a positive refractive power that is disposed on the object side relative to the aperture stop SP, although correction of the secondary spectrum of axial chromatic aberration will be easy, correction of the secondary spectrum of chromatic aberration of magnification will be difficult. However, in a case where a material having a high extraordinary dispersion characteristic is used in a positive lens in the second lens sub-unit L1b having a positive refractive power that is disposed on the image side relative to the aperture stop SP, secondary spectrum correction with respect to both axial chromatic aberration and chromatic aberration of magnification is easy.

Therefore, by using a material having a high extraordinary dispersion characteristic in a positive lens that is included in the second lens sub-unit L1b, and setting the refractive power of the second lens sub-unit L1b to be stronger than the refractive power of the first lens sub-unit L1a, axial chromatic aberration and chromatic aberration of magnification are satisfactorily corrected.

If the focal length of the second lens sub-unit L1b is longer than the focal length of the first lens sub-unit L1a and exceeds the upper limit of the conditional expression (3), it will be difficult to satisfactorily correct both axial chromatic aberration and chromatic aberration of magnification. If the focal length of the second lens sub-unit L1b is shorter than the focal length of the first lens sub-unit L1a and is less than the lower limit of the conditional expression (3), it will be difficult to correct aberrations such as spherical aberration, comatic aberration and astigmatism.

Note that the numerical ranges of the conditional expressions (1), (2) and (3) can be more preferably set as follows.

$$0.005 < \Delta\theta gFLp \qquad (1a)$$

$$0.5 < fLp/f1 < 1.1 \qquad (2a)$$

$$0.18 < f1b/f1a < 0.55 \qquad (3a)$$

More preferably, the numerical ranges of the conditional expressions (1a), (2a) and (3a) can be set as follows.

$$0.010 < \Delta\theta gFLp \qquad (1b)$$

$$0.6 < fLp/f1 < 1.0 \qquad (2b)$$

$$0.22 < f1b/f1a < 0.50 \qquad (3b)$$

By adopting the above configuration, an optical system is obtained that, while having a high aperture ratio, satisfactorily corrects aberrations that include chromatic aberration and has high optical performance over the entire object distance from infinity to a close distance.

More preferably, in the respective exemplary embodiments, one or more of the following conditional expressions is satisfied.

Here, an Abbe number at a d-line of the material of the positive lens Lp will be represented by νdLp. The second lens sub-unit L1b has one or more positive lenses on the image side of the positive lens Lp, and the focal length of the positive lens Lpr with the strongest refractive power among the one or more positive lenses will be represented by fLpr. The second lens sub-unit L1b has a cemented lens Lpc formed by cementing together a positive lens Lp and a negative lens, and a cemented lens Lc2 formed by cementing together a plurality of lenses that is disposed on the image side of the cemented lens Lpc, with the focal length of the cemented lens Lpc being represented by fLpc and the focal length of the cemented lens Lc2 being represented by fLc2.

Here, an average value of the refractive index at a d-line of the material of the positive lenses included in the second lens sub-unit L1b will be represented by Ndrave. The second lens sub-unit L1b has one or more positive lenses on the image side of the positive lens Lp, and one positive lens among the one or more positive lenses will be represented here by positive lens Lpa, with the Abbe number and the relative partial dispersion of the material of the positive lens Lpa being represented by vdpa and θgFpa, respectively. When the focal length of the positive lens Lpa is represented by fLpa, the second lens sub-unit L1b has one or more negative lenses, and the Abbe number and the relative partial dispersion of the material of one negative lens Lna among the one or more negative lenses are represented by vdna and θgFna, respectively. The back focus when focusing at infinity is represented by bf.

At such time, it is favorable to satisfy one or more of the following conditional expressions:

$$50.0 < vdLp \quad (4)$$

$$0.2 < fLpr/fLp < 1.1 \quad (5)$$

$$-0.80 < fLpc/fLc2 < -0.15 \quad (6)$$

$$1.60 < Ndrave < 1.83 \quad (7)$$

$$0.0 < \theta gFpa - (-1.720 \times 10^{-7} \times vdpa^3 + 5.572 \times 10^{-5} \times vdpa^2 - 5.755 \times 10^{-3} \times vdpa + 0.7245) \quad (8)$$

$$0.20 < fLpa/f1 < 1.00 \quad (9)$$

$$\theta gFna - (-4.516 \times 10^{-5} \times vdna^2 + 1.291 \times 10^{-3} \times vdna + 0.965) < 0.0 \quad (10)$$

$$0.01 < bf/f1b < 0.60 \quad (11).$$

Next, the technical meaning of each of the foregoing conditional expressions will be described. The conditional expression (4) appropriately defines an Abbe number at a d-line of the material of the positive lens Lp in order to satisfactorily correct axial chromatic aberration and chromatic aberration of magnification that arise in the first lens unit L1 that has a positive refractive power. By using a material having an Abbe number that is greater than the lower limit value of the conditional expression (4), it is easy to satisfactorily correct axial chromatic aberration and chromatic aberration of magnification.

The conditional expression (5) appropriately defines a ratio between the focal length of the positive lens Lp and the focal length of the positive lens Lpr in order to satisfactorily correct aberrations that include chromatic aberration that arise in the first lens unit L1 having a positive refractive power. If the focal length of the positive lens Lpr is long to an extent such that the focal length exceeds the upper limit of the conditional expression (5), or if the focal length of the positive lens Lp is short, the occurrence of aberrations such as spherical aberration, comatic aberration and astigmatism increases and correction of these aberrations becomes difficult. If the focal length of the positive lens Lpr is short to an extent such that the focal length is less than the lower limit of the conditional expression (5) or if the focal length of the positive lens Lp is long, it becomes difficult to correct axial chromatic aberration and chromatic aberration of magnification.

The conditional expression (6) appropriately defines a ratio between the negative focal length of the cemented lens Lpc and the positive focal length of the cemented lens Lc2 in order to satisfactorily correct aberrations that include chromatic aberration that arise in the first lens unit L1 that has a positive refractive power.

If the absolute value of the negative focal length of the cemented lens Lpc exceeds the upper limit of the conditional expression (6) and becomes small relative to the absolute value of the positive focal length of the cemented lens Lc2, correction of axial chromatic aberration and chromatic aberration of magnification will be difficult. If the absolute value of the negative focal length of the cemented lens Lpc is lower than the lower limit of the conditional expression (6) and becomes large relative to the absolute value of the positive focal length of the cemented lens Lc2, the occurrence of aberrations such as spherical aberration, comatic aberration and astigmatism increases, and correction of these aberrations becomes difficult.

The conditional expression (7) appropriately defines the average of the refractive indexes at a d-line of the materials of all of the positive lenses included in the second lens sub-unit L1b in order to satisfactorily correct aberrations that include chromatic aberration that arise in the first lens unit L1 that has a positive refractive power.

If the average value of the refractive indexes at the d-line of the materials of all of the positive lenses included in the second lens sub-unit L1b is large to an extent such that the average value exceeds the upper limit of the conditional expression (7), it means that a large amount of highly dispersive material is used, and correction of axial chromatic aberration and chromatic aberration of magnification will be difficult. If the average value of the refractive indexes at the d-line of the materials of the positive lenses in the second lens sub-unit L1b is small to an extent such that the average value is lower than the lower limit of the conditional expression (7), the curvature radius of the lens surfaces of the respective positive lenses decreases. Therefore, a large amount of aberrations such as spherical aberration, comatic aberration and astigmatism will arise, and correction of these aberrations will be difficult.

The conditional expression (8) appropriately defines the partial dispersion ratio of the material of the positive lens Lpa which is included in the second lens sub-unit L1b and which is disposed on the image side of the positive lens Lp, in order to satisfactorily correct axial chromatic aberration and chromatic aberration of magnification that arise inside the first lens unit L1 having a positive refractive power. By using a material having a partial dispersion ratio satisfying the conditional expression (8) in the positive lens Lpa, the secondary spectra of axial chromatic aberration and chromatic aberration of magnification are satisfactorily corrected. In particular, the secondary spectrum of chromatic aberration of magnification is satisfactorily corrected by arranging the positive lens Lpa on the image side of the positive lens Lp.

The conditional expression (9) appropriately defines the focal length of the positive lens Lpa in order to satisfactorily correct aberrations that include chromatic aberration that arise in the first lens unit L1 having a positive refractive power. If the focal length of the positive lens Lpa is long to an extent such that that the focal length exceeds the upper limit of the conditional expression (9), the effect of correcting the secondary spectra of axial chromatic aberration and chromatic aberration of magnification will decrease, and consequently it will be difficult to correct axial chromatic aberration and chromatic aberration of magnification. If the focal length of the positive lens Lpa is short to an extent such that that the focal length is less than the lower limit of the conditional expression (9), the curvature radius of the lens surface of the positive lens Lpa will be too small, and consequently a large amount of aberrations such as spherical aberration, comatic aberration and astigmatism will arise and it will be difficult to correct these aberrations.

The conditional expression (10) appropriately defines the partial dispersion ratio of the material of the negative lens Lna included in the second lens sub-unit L1b in order to satisfactorily correct axial chromatic aberration and chromatic aberration of magnification that arise in the first lens unit L1 having a positive refractive power.

In each exemplary embodiment, the secondary spectra of axial chromatic aberration and chromatic aberration of magnification are satisfactorily corrected by using a material having a high extraordinary dispersion characteristic as the material of the positive lens Lpa included in the second lens sub-unit L1b and using a material having a low extraordinary dispersion characteristic in the negative lens Lna.

By using a material having a partial dispersion ratio that satisfies the conditional expression (10) in the negative lens Lna included in the second lens sub-unit L1b, the secondary spectrum of axial chromatic aberration and chromatic aberration of magnification are satisfactorily corrected.

The conditional expression (11) appropriately defines a ratio between the back focus and the focal length of the second lens sub-unit L1b in order to achieve a reduction in the overall size of the optical system while satisfactorily correcting chromatic aberration that arises in the first lens unit L1 that has a positive refractive power.

If the back focus is long to an extent such that the back focus exceeds the upper limit of the conditional expression (11), it is difficult to reduce the overall size of the optical system. Further, if the focal length of the second lens sub-unit L1b is short to an extent such that the upper limit of the conditional expression (11) is exceeded, the occurrence of aberrations such as spherical aberration, comatic aberration and astigmatism will increase, and it will be difficult to correct these aberrations. If the focal length of the second lens sub-unit L1b is long to an extent such that the lower limit of the conditional expression (11) is exceeded, the effect of correcting the secondary spectra of axial chromatic aberration and chromatic aberration of magnification will decrease, and consequently it will be difficult to correct axial chromatic aberration and chromatic aberration of magnification.

Note that, in each of the exemplary embodiments, it is preferable to make the numerical ranges of the conditional expression (4) to the conditional expression (11) as follows.

$$58.0 < vdLp \tag{4a}$$

$$0.30 < fLpr/fLp < 1.00 \tag{5a}$$

$$-0.70 < fLpc/fLc2 < -0.20 \tag{6a}$$

$$1.63 < Ndrave < 1.80 \tag{7a}$$

$$0.001 < \theta gFpa - (-1.720 \times 10^{-7} \times vdpa^3 + 5.572 \times 10^{-5} \times vdpa^2 - 5.755 \times 10^{-3} \times vdpa + 0.7245) \tag{8a}$$

$$0.30 < fLpa/f1 < 0.85 \tag{9a}$$

$$\theta gFna - (-4.516 \times 10^{-5} \times vdna^2 + 1.291 \times 10^{-3} \times vdna + 0.965) < -0.0005 \tag{10a}$$

$$0.10 < bf/f1b < 0.50 \tag{11a}$$

More preferably, the numerical ranges of conditional expression (4a) to conditional expression (11a) can be set as follows, and thus the effects that the respective conditional expressions mean which are described above are obtained to the maximum.

$$65.0 < vdLp \tag{4b}$$

$$0.40 < fLpr/fLp < 0.95 \tag{5b}$$

$$-0.60 < fLpc/fLc2 < -0.25 \tag{6b}$$

$$1.66 < Ndrave < 1.77 \tag{7b}$$

$$0.0015 < \theta gFpa - (-1.720 \times 10^{-7} \times vdpa^3 + 5.572 \times 10^{-5} \times vdpa^2 - 5.755 \times 10^{-3} \times vdpa + 0.7245) \tag{8b}$$

$$0.40 < fLpa/f1 < 0.70 \tag{9b}$$

$$\theta gFna - (-4.516 \times 10^{-5} \times vdna^2 + 1.291 \times 10^{-3} \times vdna + 0.965) < -0.001 \tag{10b}$$

$$0.20 < bf/f1b < 0.40 \tag{11b}$$

By configuring the respective elements as described above in each of the exemplary embodiments, an optical system is obtained that, while having a high aperture ratio, satisfactorily corrects aberrations that include chromatic aberration and has high optical performance over the entire object distance from infinity to a close distance.

In order to obtain high optical performance over the entire object distance from infinity to a close distance, as in each exemplary embodiment, it is favorable to adopt the following configuration. Preferably, the first lens unit L1 consists of a first lens sub-unit L1a, an aperture stop SP, and a second lens sub-unit L1b that are disposed in that order from the object side to the image side, and that the first lens unit L1 is moved for focusing. By moving the first lens unit L1 for focusing, it is easy to satisfactorily correct fluctuations in aberrations that include chromatic aberration that are caused by focusing, while also reducing the overall size of the optical system.

Preferably, the first lens sub-unit L1a consists of a total of six lenses that are, in order from the object side to the image side, a cemented lens formed by cementing a positive lens G1 and a negative lens G2 together, a positive lens G3, a negative lens G4, and a cemented lens formed by cementing a negative lens G5 and a positive lens G6 together. By configuring the first lens sub-unit L1a in this manner, it is easy to satisfactorily correct comatic aberration or astigmatism and the like while having a large aperture and also achieving a reduction in the size of the lens outer diameter.

In Embodiments 1 to 3, the second lens sub-unit L1b preferably consists of five lenses that are, in order from the object side to the image side, a cemented lens formed by cementing a positive lens G7 and a negative lens G8 together, a cemented lens formed by cementing a positive lens G9 and a negative lens G10 together, and a positive lens G11. By configuring the second lens sub-unit L1b in this manner, it is easy to satisfactorily perform correction of axial chromatic aberration and chromatic aberration of magnification as well as correction of aberrations such as spherical aberration, comatic aberration and astigmatism.

In Embodiment 4, it is favorable for the second lens sub-unit L1b to consist of, in order from the object side to the image side, a cemented lens formed by cementing together a positive lens G7 and a negative lens G8, a cemented lens formed by cementing together a positive lens G9 and a negative lens G10, and a positive lens G11. Furthermore, the second lens sub-unit L1b preferably consists of nine lenses which are the aforementioned five lenses and, in addition, a cemented lens formed by cementing together a positive lens G12 and a negative lens G13, and a cemented lens formed by cementing together a negative lens G14 and a positive lens G15.

By configuring the second lens sub-unit L1b in this manner, it is easy to satisfactorily perform correction of axial chromatic aberration and chromatic aberration of magnification as well as correction of aberrations such as spherical aberration, comatic aberration, astigmatism and sagittal flare.

In Embodiments 1 to 3, the second lens unit L2 preferably consists of four lenses that are, in order from the object side to the image side, a cemented lens formed by cementing a positive lens G12 and a negative lens G13 together, and a cemented lens formed by cementing a negative lens G14 and a positive lens G15 together. By configuring the second lens unit L2 in this manner, it is easy to satisfactorily correct fluctuations in spherical aberration and comatic aberration that are caused by focusing. Further, it is easy to satisfactorily correct sagittal flare over the entire object distance from infinity to a close distance.

According to the respective exemplary embodiments, by adopting the configurations described above, an optical system can be obtained that, while having a high aperture ratio, satisfactorily corrects aberrations that include chromatic aberration and has high optical performance over the entire object distance from infinity to a close distance.

Next, an exemplary embodiment of an image pickup apparatus (digital camera) in which the optical system is used will be described using FIG. 9. In FIG. 9, reference numeral 30 denotes a camera body, and reference numeral 31 denotes an optical system according to any one of Embodiments 1 to 4. An image pickup element (photoelectrical conversion element) such as a CCD sensor or a CMOS sensor that receives light of an image of an object formed by the optical system 31 is contained inside the camera body 30.

Hereunder, specific numerical data of Embodiments 1 to 4 is described. In the respective items of numerical data, reference character i represents the order as counted from the object side. Reference character ri represents the curvature radius of the i-th surface from the object side, reference character di represents the distance between the i-th surface and the i+1-th surface from the object side, reference character ni represents the refractive index at the d-line of the optical medium between the i-th surface and the i+1-th surface, and reference character νi represents the Abbe number at the d-line of the optical medium between the i-th surface and the i+1-th surface. Reference characters θgFi and ΔθgFi represent the partial dispersion ratio and the extraordinary dispersion characteristic of the material of the optical medium between the i-th surface and the i+1-th surface, respectively.

With respect to aspherical shapes, k represents the conic constant, A4, A6, A8, A10 and A12 represent the $4^{th}$-order, $6^{th}$-order, $8^{th}$-order, $10^{th}$-order and $12^{th}$-order aspherical surface coefficients, respectively, and a displacement in the optical axis direction at a position of a height h from the optical axis based on a surface vertex is defined as x.

At this time, the aspherical shape is represented by:

$$x=(h^2/R)/[1+[1-(1+K)(h/R)^2]^{1/2}]+A4h^4+A6h^6+A8h^8+A10h^{10}+A12h^{12}.$$

Where, R represents the paraxial curvature radius. Further, e-X means $\times 10^{-X}$. Note that, an aspherical surface is expressed by affixing an * mark on the right side of the relevant surface number in the respective tables. The relation between each conditional expression described above and the numerical data is shown in Table 1. Further, the positive lens Lp, positive lens Lpr, positive lens Lpa and negative lens Lna in the respective exemplary embodiments are shown in Table 2.

[Numerical Data 1]

| Unit: mm | | | | | | |
|---|---|---|---|---|---|---|
| Surface Data | | | | | | |
| Surface Number | r | d | nd | νd | θgF | ΔθgF |
| 1* | 82.909 | 8.39 | 1.76802 | 49.2 | 0.5515 | −0.0103 |
| 2 | −68.211 | 1.50 | 1.73800 | 32.3 | 0.5899 | 0.0006 |
| 3 | 77.682 | 0.20 | | | | |
| 4 | 40.481 | 6.87 | 1.95375 | 32.3 | 0.5901 | 0.0009 |
| 5 | 855.015 | 0.20 | | | | |
| 6 | 74.822 | 1.40 | 1.65412 | 39.7 | 0.5737 | −0.0036 |
| 7 | 25.210 | 6.56 | | | | |
| 8 | −1195.622 | 1.20 | 1.66565 | 35.6 | 0.5820 | −0.0018 |
| 9 | 31.561 | 4.14 | 2.00100 | 29.1 | 0.5994 | 0.0050 |
| 10 | 75.602 | 3.47 | | | | |
| 11 (Stop) | ∞ | 3.09 | | | | |
| 12 | −92.693 | 7.53 | 1.43875 | 94.7 | 0.5340 | 0.0457 |
| 13 | −21.093 | 1.20 | 1.72047 | 34.7 | 0.5834 | −0.0019 |
| 14 | 349.334 | 0.20 | | | | |
| 15 | 55.420 | 10.37 | 1.76385 | 48.5 | 0.5589 | −0.0041 |
| 16 | −29.287 | 1.30 | 1.66565 | 35.6 | 0.5820 | −0.0018 |
| 17 | 55.742 | 0.71 | | | | |
| 18* | 65.419 | 8.32 | 1.85400 | 40.4 | 0.5688 | −0.0074 |
| 19* | −49.838 | (Variable) | | | | |
| 20 | 52.651 | 10.03 | 1.88300 | 40.8 | 0.5667 | −0.0089 |
| 21 | −47.216 | 1.50 | 1.66565 | 35.6 | 0.5820 | −0.0018 |
| 22 | 41.182 | 7.53 | | | | |
| 23 | −48.251 | 1.40 | 1.61340 | 44.3 | 0.5633 | −0.0066 |

-continued

| Unit: mm | | | | | | |
|---|---|---|---|---|---|---|
| 24 | 151.332 | 3.90 | 1.85400 | 40.4 | 0.5688 | −0.0074 |
| 25* | −163.746 | 14.00 | | | | |
| Image Plane | ∞ | | | | | |

Aspherical Surface Data

First Surface

K = 0.00000e+000    A4 = −1.39341e−006    A6 = −4.81896e−010    A8 = 7.22917e−014
A10 = 2.22678e−017

Eighteenth Surface

K = 0.00000e+000    A4 = −2.25923e−006    A6 = 8.73754e−010    A8 = −3.92386e−012
A10 = −8.48899e−018

Nineteenth Surface

K = 0.00000e+000    A4 = 1.43503e−006    A6 = 8.01071e−010    A8 = −1.43275e−012

Twenty-fifth Surface

K = 0.00000e+000    A4 = 2.90301e−006    A6 = 2.73324e−010    A8 = 1.09277e−011
A10 = −1.31337e−014    A12 = 5.68359e−018

Various Data

| | |
|---|---|
| Focal Length | 51.50 |
| F-number | 1.24 |
| Half Angle of View (Degrees) | 22.79 |
| Image Height | 21.64 |
| Total Length of Lens | 106.00 |
| BF | 14.00 |

| | Infinity | Closest |
|---|---|---|
| d19 | 1.00 | 13.22 |

| Unit | Starting Surface | Focal Length |
|---|---|---|

Lens Unit Data

| | | |
|---|---|---|
| 1 | 1 | 62.11 |
| 2 | 20 | 614.51 |

Data Within Group 1

| | | |
|---|---|---|
| L1a | 1 | 172.21 |
| Aperture Stop | 11 | ∞ |
| L1b | 12 | 56.98 |

| Lens | Starting Surface | Focal Length |
|---|---|---|

Single Lens Data

| | | |
|---|---|---|
| 1 | 1 | 49.93 |
| 2 | 2 | −49.00 |
| 3 | 4 | 44.37 |
| 4 | 6 | −58.78 |
| 5 | 8 | −46.18 |
| 6 | 9 | 51.70 |
| 7 | 12 | 60.31 |
| 8 | 13 | −27.57 |
| 9 | 15 | 26.49 |
| 10 | 16 | −28.67 |
| 11 | 18 | 34.26 |
| 12 | 20 | 29.58 |
| 13 | 21 | −32.82 |
| 14 | 23 | −59.49 |
| 15 | 24 | 92.62 |

Cemented Lens Data

| | | |
|---|---|---|
| 1 | 1 | 1469.17 |
| 2 | 8 | −345.19 |
| 3 | 12 | −48.64 |
| 4 | 15 | 165.37 |
| 5 | 20 | 152.71 |
| 6 | 23 | −175.12 |

[Numerical Data 2]

| | Unit: mm | | | | | |
|---|---|---|---|---|---|---|
| | Surface Data | | | | | |
| Surface Number | r | d | nd | vd | θgF | ΔθgF |
| 1* | 80.110 | 9.67 | 1.80400 | 46.58 | 0.5573 | −0.0088 |
| 2 | −68.243 | 1.64 | 1.68893 | 31.07 | 0.6004 | 0.0092 |
| 3 | 52.862 | 0.20 | | | | |
| 4 | 42.184 | 7.47 | 2.00100 | 29.13 | 0.5997 | 0.0050 |
| 5 | 2510.576 | 0.70 | | | | |
| 6 | 99.979 | 1.60 | 1.65412 | 39.68 | 0.5737 | −0.0036 |
| 7 | 24.508 | 7.45 | | | | |
| 8 | −101.919 | 1.34 | 1.66565 | 35.64 | 0.5824 | −0.0018 |
| 9 | 34.799 | 5.56 | 1.95375 | 32.32 | 0.5898 | 0.0009 |
| 10 | 516.053 | 2.44 | | | | |
| 11 (Stop) | ∞ | 2.58 | | | | |
| 12 | −1398.232 | 10.02 | 1.49700 | 81.54 | 0.5375 | 0.0279 |
| 13 | −20.985 | 1.29 | 1.73800 | 32.26 | 0.5899 | 0.0006 |
| 14 | 251.143 | 0.44 | | | | |
| 15 | 87.566 | 7.29 | 1.76385 | 48.51 | 0.5587 | −0.0041 |
| 16 | −43.447 | 1.28 | 1.66565 | 35.64 | 0.5824 | −0.0018 |
| 17 | 105.692 | 1.79 | | | | |
| 18* | 161.695 | 7.96 | 1.88300 | 40.80 | 0.5652 | −0.0101 |
| 19 | −42.423 | (Variable) | | | | |
| 20 | 54.474 | 8.77 | 1.88300 | 40.80 | 0.5652 | −0.0101 |
| 21 | −60.531 | 1.54 | 1.59551 | 39.24 | 0.5803 | 0.0023 |
| 22 | 40.560 | 7.14 | | | | |
| 23 | −58.170 | 1.21 | 1.67300 | 38.15 | 0.5754 | −0.0044 |
| 24 | 105.985 | 5.08 | 1.80400 | 46.58 | 0.5573 | −0.0088 |
| 25* | −216.191 | 14.60 | | | | |
| Image Plane | ∞ | | | | | |

Aspherical Surface Data

First Surface

K = 0.00000e+000   A4 = −1.44652e−006   A6 = −1.02693e−009   A8 = 1.91678e−012
A10 = −3.07794e−015   A12 = 2.00476e−018

Eighteenth Surface

K = 0.00000e+000   A4 = −2.17027e−006   A6 = 4.00496e−009   A8 = −1.90948e−011
A10 = 4.86536e−014   A12 = −4.89586e−017

Twenty-fifth Surface

K = 0.00000e+000   A4 = 3.50064e−006   A6 = −5.98670e−010   A8 = 1.34319e−011
A10 = −2.56798e−014   A12 = 2.59930e−017

Various Data

| | | |
|---|---|---|
| Focal Length | | 51.10 |
| F-number | | 1.25 |
| Half Angle of View (Degrees) | | 22.95 |
| Image Height | | 21.64 |
| Total Length of Lens | | 111.01 |
| BF | | 14.60 |

| | Infinity | Closest |
|---|---|---|
| d19 | 1.95 | 16.11 |

| Unit | Starting Surface | Focal Length |
|---|---|---|
| Lens Unit Data | | |
| 1 | 1 | 61.31 |
| 2 | 20 | 586.40 |
| Data Within Group 1 | | |
| L1a | 1 | 198.77 |
| Aperture Stop | 11 | ∞ |
| L1b | 12 | 55.13 |

-continued

| Lens | Starting Surface | Focal Length |
|---|---|---|
| Unit: mm | | |
| Single Lens Data | | |
| 1 | 1 | 47.21 |
| 2 | 2 | −43.00 |
| 3 | 4 | 42.80 |
| 4 | 6 | −50.05 |
| 5 | 8 | −38.82 |
| 6 | 9 | 38.91 |
| 7 | 12 | 42.76 |
| 8 | 13 | −26.19 |
| 9 | 15 | 38.96 |
| 10 | 16 | −46.10 |
| 11 | 18 | 38.77 |
| 12 | 20 | 33.67 |
| 13 | 21 | −40.55 |
| 14 | 23 | −55.64 |
| 15 | 24 | 89.08 |
| Cemented Lens Data | | |
| 1 | 1 | −1809.79 |
| 2 | 8 | −17471.87 |
| 3 | 12 | −67.39 |
| 4 | 15 | 204.76 |
| 5 | 20 | 136.64 |
| 6 | 23 | −154.68 |

[Numerical Data 3]

| Surface Number | r | d | nd | νd | θgF | ΔθgF |
|---|---|---|---|---|---|---|
| Unit: mm | | | | | | |
| Surface Data | | | | | | |
| 1 | 223.541 | 6.85 | 1.80400 | 46.58 | 0.5573 | −0.0088 |
| 2 | −51.775 | 1.50 | 1.73800 | 32.26 | 0.5899 | 0.0006 |
| 3 | 56.579 | 0.20 | | | | |
| 4 | 33.983 | 7.65 | 1.95375 | 32.32 | 0.5898 | 0.0009 |
| 5 | 191.944 | 0.40 | | | | |
| 6* | 36.354 | 1.40 | 1.65412 | 39.68 | 0.5737 | −0.0036 |
| 7 | 23.649 | 9.58 | | | | |
| 8 | −80.008 | 1.30 | 1.66565 | 35.64 | 0.5824 | −0.0018 |
| 9 | 39.501 | 5.15 | 2.00100 | 29.13 | 0.5997 | 0.0050 |
| 10 | −883.910 | 2.04 | | | | |
| 11 (Stop) | ∞ | 4.14 | | | | |
| 12 | −70.654 | 8.52 | 1.59522 | 67.74 | 0.5442 | 0.0123 |
| 13 | −19.484 | 1.20 | 1.73800 | 32.26 | 0.5899 | 0.0006 |
| 14 | 317.429 | 0.20 | | | | |
| 15 | 68.670 | 9.16 | 1.76385 | 48.51 | 0.5587 | −0.0041 |
| 16 | −36.752 | 1.30 | 1.66565 | 35.64 | 0.5824 | −0.0018 |
| 17 | 128.305 | 1.21 | | | | |
| 18* | 177.452 | 7.40 | 1.88300 | 40.76 | 0.5667 | −0.0089 |
| 19* | −48.513 | (Variable) | | | | |
| 20 | 58.020 | 9.90 | 1.88300 | 40.76 | 0.5667 | −0.0089 |
| 21 | −44.927 | 1.43 | 1.66565 | 35.64 | 0.5824 | −0.0018 |
| 22 | 42.504 | 7.20 | | | | |
| 23 | −47.989 | 1.40 | 1.61340 | 44.27 | 0.5633 | −0.0066 |
| 24 | 65.040 | 5.00 | 1.85400 | 40.38 | 0.5688 | −0.0074 |
| 25* | −233.207 | (Variable) | | | | |
| Image Plane | ∞ | | | | | |

Aspherical Surface Data

Sixth Surface

K = 0.00000e+000    A4 = −3.21260e−006    A6 = −3.55131e−009    A8 = −8.76822e−012
A10 = 8.39780e−015

-continued

| Unit: mm |
|---|

Eighteenth Surface

K = 0.00000e+000    A4 = −4.66481e−006    A6 = −2.24063e−009    A8 = −2.58094e−012
A10 = 1.31311e−015

Nineteenth Surface

K = 0.00000e+000    A4 = −1.33031e−006    A6 = −2.62278e−009    A8 = −1.55136e−012

Twenty-fifth Surface

K = 0.00000e+000    A4 = 3.57096e−006    A6 = 5.74477e−010    A8 = 1.72057e−012
A10 = 2.16305e−015

Various Data

| | |
|---|---|
| Focal Length | 49.66 |
| F-number | 1.24 |
| Half Angle of View (Degrees) | 23.54 |
| Image Height | 21.64 |
| Total Length of Lens | 108.64 |
| BF | 13.50 |

| | Infinity | Closest |
|---|---|---|
| d19 | 1.00 | 12.71 |
| d25 | 13.50 | 12.48 |

| Unit | Starting Surface | Focal Length |
|---|---|---|

Lens Unit Data

| | | |
|---|---|---|
| 1 | 1 | 57.61 |
| 2 | 20 | 1105.73 |

Data Within Group 1

| | | |
|---|---|---|
| L1a | 1 | 121.98 |
| Aperture Stop | 11 | ∞ |
| L1b | 12 | 60.68 |

| Lens | Starting Surface | Focal Length |
|---|---|---|

Single Lens Data

| | | |
|---|---|---|
| 1 | 1 | 52.87 |
| 2 | 2 | −36.42 |
| 3 | 4 | 42.30 |
| 4 | 6 | −108.16 |
| 5 | 8 | −39.56 |
| 6 | 9 | 37.88 |
| 7 | 12 | 42.55 |
| 8 | 13 | −24.84 |
| 9 | 15 | 32.57 |
| 10 | 16 | −42.78 |
| 11 | 18 | 43.82 |
| 12 | 20 | 30.03 |
| 13 | 21 | −32.60 |
| 14 | 23 | −44.81 |
| 15 | 24 | 60.01 |

Cemented Lens Data

| | | |
|---|---|---|
| 1 | 1 | −125.68 |
| 2 | 8 | 733.03 |
| 3 | 12 | −53.94 |
| 4 | 15 | 113.53 |
| 5 | 20 | 180.95 |
| 6 | 23 | −190.48 |

[Numerical Data 4]

| | | Unit: mm | | | | |
|---|---|---|---|---|---|---|
| | | Surface Data | | | | |
| Surface Number | r | d | nd | νd | θgF | ΔθgF |
| 1* | 62.022 | 9.40 | 1.80400 | 46.58 | 0.5573 | −0.0088 |
| 2 | −73.650 | 1.20 | 1.68893 | 31.07 | 0.6004 | 0.0092 |
| 3 | 43.632 | 0.20 | | | | |
| 4 | 36.292 | 7.50 | 2.00100 | 29.13 | 0.5997 | 0.0050 |
| 5 | 306.885 | 0.50 | | | | |
| 6 | 82.008 | 1.20 | 1.65412 | 39.68 | 0.5737 | −0.0036 |
| 7 | 21.343 | 7.45 | | | | |
| 8 | −226.135 | 1.34 | 1.66565 | 35.64 | 0.5824 | −0.0018 |
| 9 | 34.586 | 5.56 | 1.95375 | 32.32 | 0.5898 | 0.0009 |
| 10 | 200.510 | 2.00 | | | | |
| 11 (Stop) | ∞ | 2.00 | | | | |
| 12 | −206.999 | 9.50 | 1.59522 | 67.74 | 0.5442 | 0.0123 |
| 13 | −20.984 | 1.29 | 1.73800 | 32.26 | 0.5899 | 0.0006 |
| 14 | 105.525 | 0.44 | | | | |
| 15 | 66.670 | 7.29 | 1.76385 | 48.51 | 0.5587 | −0.0041 |
| 16 | −39.441 | 1.28 | 1.65412 | 39.68 | 0.5737 | −0.0036 |
| 17 | 151.359 | 1.40 | | | | |
| 18* | 229.711 | 7.10 | 1.88300 | 40.80 | 0.5652 | −0.0101 |
| 19* | −47.868 | 0.30 | | | | |
| 20 | 77.851 | 8.50 | 1.88300 | 40.80 | 0.5652 | −0.0101 |
| 21 | −42.153 | 1.20 | 1.59551 | 39.24 | 0.5803 | 0.0023 |
| 22 | 49.261 | 6.50 | | | | |
| 23 | −68.406 | 1.20 | 1.66565 | 35.64 | 0.5824 | −0.0018 |
| 24 | 44.331 | 6.80 | 1.85400 | 40.38 | 0.5688 | −0.0074 |
| 25* | −213.325 | (Variable) | | | | |
| Image Plane | ∞ | | | | | |

Aspherical Surface Data

First Surface

K = 0.00000e+000   A4 = −1.18603e−006   A6 = −3.97854e−009   A8 = 1.11659e−011
A10 = −1.80729e−014   A12 = 1.15111e−017

Eighteenth Surface

K = 0.00000e+000   A4 = −4.85779e−006   A6 = 3.34976e−008   A8 = −1.52805e−010
A10 = 4.34636e−013   A12 = −2.58798e−016

Nineteenth Surface

K = 0.00000e+000   A4 = −1.85392e−006   A6 = 1.25294e−008   A8 = −1.28774e−011
A10 = −3.75332e−014   A12 = 3.47067e−016

Twenty-fifth Surface

K = 0.00000e+000   A4 = 6.09163e−006   A6 = −2.63325e−008   A8 = 1.09898e−010
A10 = −2.20659e−013   A12 = 1.78857e−016

Various Data

| | |
|---|---|
| Focal Length | 51.09 |
| F-number | 1.24 |
| Half Angle of View (Degrees) | 22.95 |
| Image Height | 21.64 |
| Total Length of Lens | 108.00 |
| BF | 16.85 |

| | Infinity | Closest |
|---|---|---|
| d25 | 16.85 | 23.66 |

| Unit | Starting Surface | Focal Length |
|---|---|---|
| | Lens Unit Data | |
| 1 | 1 | 51.09 |
| | Data Within Group 1 | |
| L1a | 1 | 187.57 |
| Aperture Stop | 11 | ∞ |
| L1b | 12 | 43.21 |

-continued

Unit: mm

| Lens | Starting Surface | Focal Length |
|---|---|---|
| Single Lens Data | | |
| 1 | 1 | 43.21 |
| 2 | 2 | −39.61 |
| 3 | 4 | 40.56 |
| 4 | 6 | −44.46 |
| 5 | 8 | −44.97 |
| 6 | 9 | 43.12 |
| 7 | 12 | 38.50 |
| 8 | 13 | −23.62 |
| 9 | 15 | 33.44 |
| 10 | 16 | −47.71 |
| 11 | 18 | 45.41 |
| 12 | 20 | 32.03 |
| 13 | 21 | −37.96 |
| 14 | 23 | −40.24 |
| 15 | 24 | 43.51 |
| Cemented Lens Data | | |
| 1 | 1 | −7064.62 |
| 2 | 8 | 1405.82 |
| 3 | 12 | −58.96 |
| 4 | 15 | 99.62 |
| 5 | 20 | 153.72 |
| 6 | 23 | −745.76 |

TABLE 1

| | Embodiment | | | |
|---|---|---|---|---|
| Conditional Expression | 1 | 2 | 3 | 4 |
| (1) $0.0 < \Delta\theta gFLp$ | 0.0457 | 0.0279 | 0.0123 | 0.0123 |
| (2) $0.4 < fLp/f1 < 1.2$ | 0.971 | 0.698 | 0.739 | 0.754 |
| (3) $0.15 < f1b/f1a < 0.60$ | 0.331 | 0.277 | 0.497 | 0.230 |
| (4) $50.0 < vdLp$ | 94.66 | 81.54 | 67.74 | 67.74 |
| (5) $0.2 < fLpr/fLp < 1.1$ | 0.439 | 0.907 | 0.765 | 0.832 |
| (6) $-0.80 < fLpc/fLc2 < -0.15$ | −0.294 | −0.329 | −0.475 | −0.592 |
| (7) $1.60 < Ndrave < 1.83$ | 1.686 | 1.715 | 1.747 | 1.747 |
| (8) $0.0 < \theta gFpa - (-1.720 \times 10^{-7} \times vdpa^3 + 5.572 \times 10^{-5} \times vdpa^2 - 5.755 \times 10^{-3} \times vdpa + 0.7245)$ | 0.0021 | 0.0021 | 0.0021 | 0.0021 |
| (9) $0.20 < fLpa/f1 < 1.00$ | 0.426 | 0.635 | 0.565 | 0.654 |
| (10) $\theta gFna - (-4.516 \times 10^{-5} \times vdna^2 + 1.291 \times 10^{-3} \times vdna + 0.965) < 0.0$  G8 | −0.0035 | −0.0012 | −0.0012 | −0.0012 |
| G10 | −0.0031 | −0.0031 | −0.0031 | −0.0029 |
| G14 | — | — | — | −0.0031 |
| (11) $0.01 < bf/f1b < 0.60$ | 0.246 | 0.265 | 0.222 | 0.390 |

TABLE 2

| | Embodiment 1 | Embodiment 2 | Embodiment 3 | Embodiment 4 |
|---|---|---|---|---|
| Positive Lens Lp | G7 | G7 | G7 | G7 |
| Positive Lens Lpr | G9 | G11 | G9 | G12 |
| Positive Lens Lpa | G9 | G9 | G9 | G9 |
| Negative Lens Lna | G8 | G8 | G8 | G8 |
| | G10 | G10 | G10 | G10 |
| | | | | G14 |

According to the present invention, an optical system in which aberrations that include chromatic aberration are satisfactorily corrected and which has high optical performance over the entire object distance from infinity to a close distance while having a high aperture ratio is easily obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-200166, filed Oct. 16, 2017, which is hereby incorporated by reference herein in its entirety.

What is claimed is:

1. An optical system comprising a first lens unit having a positive refractive power that is configured to move to an object side for focusing from infinity to a close distance, wherein:

the first lens unit consists of, in order from the object side to an image side, a first lens sub-unit, an aperture stop, and a second lens sub-unit comprising one or more positive lenses; and the following conditional expressions are satisfied:

$0.0 < \Delta\theta gFLp$, $0.4 < fLp/f1 < 1.2$, $0.15 < f1b/f1a < 0.60$, $0.01 < bf/f1b < 0.60$, and $0.01 < bf/f1b < 0.40$ where $\Delta\theta gFLp$ is an extraordinary dispersion characteristic of the material of a positive lens Lp, the positive lens LP being included in the one or more positive lenses included in the second lens sub-unit, the positive lens LP being made of a material having a largest extraordinary dispersion characteristic among extraordinary dispersion characteristics of materials of the one or more positive lenses included in the second lens sub-unit, fLp is a focal length of the positive lens Lp, f1 is a focal length of the first lens unit, f1a is a focal length of the first lens sub-unit, f1b is a focal length of the second lens sub-unit, and bf is a back focus when focusing at infinity.

2. The optical system according to claim 1, wherein, the following conditional expression is satisfied:

$$50.0 < vdLp$$

where vdLp is an Abbe number at a d-line of the material of the positive lens Lp.

3. The optical system according to claim 1, wherein:
the second lens sub-unit comprises one or more positive lenses on the image side of the positive lens Lp, and the following conditional expression is satisfied:

$$0.2 < fLpr/fLp < 1.1$$

where fLpr is a focal length of a positive lens Lpr having a strongest refractive power among the one or more positive lenses on the image side of the positive lens Lp.

4. The optical system according to claim 1, wherein:
the second lens sub-unit comprises a cemented lens Lpc formed by cementing together the positive lens Lp and a negative lens, and a cemented lens Lc2 formed by cementing together a plurality of lenses that is disposed on the image side of the cemented lens Lpc, and, the following conditional expression is satisfied:

$$-0.80 < fLpc/fLc2 < -0.15$$

where fLpc is a focal length of the cemented lens Lpc and fLc2 is a focal length of the cemented lens Lc2.

5. The optical system according to claim 1, wherein:
the following conditional expression is satisfied:

$$1.60 < Ndrave < 1.83$$

where Ndrave is an average value of refractive indexes at a d-line of the materials of the one or more positive lenses included in the second lens sub-unit.

6. The optical system according to claim 1, wherein:
the second lens sub-unit comprises one or more positive lenses on the image side of the positive lens Lp, and the following conditional expression is satisfied:

$$0 < \theta gFpa - (-1.720 \times 10^{-7} \times vdpa^3 + 5.572 \times 10^{-5} \times vdpa^2 - 5.755 \times 10^{-3} \times vdpa + 0.7245)$$

where vdpa and θgFpa are respectively an Abbe number and a partial dispersion ratio of a material of a positive lens Lpa that is one positive lens among the one or more positive lenses on the image side of the positive lens Lp.

7. The optical system according to claim 6, wherein:
the following conditional expression is satisfied:

$$0.20 < fLpa/f1 < 1.00$$

where fLpa is a focal length of the positive lens Lpa.

8. The optical system according to claim 1, wherein:
the second lens sub-unit comprises one or more negative lenses, and the following conditional expression is satisfied:

$$\theta gFna - (-4.516 \times 10^{-5} \times vdna^2 + 1.291 \times 10^{-3} \times vdna + 0.965) < 0.0$$

where vdna and θgFna are respectively an Abbe number and a partial dispersion ratio of a material of one negative lens Lna among the one or more negative lenses.

9. The optical system according to claim 1, comprising:
a second lens unit having a positive refractive power that is disposed adjacent to an image side of the first lens unit,
wherein the second lens unit is immobile for focusing.

10. The optical system according to claim 1, comprising:
a second lens unit having a positive refractive power that is disposed adjacent to an image side of the first lens unit,
wherein the second lens unit is moved to the image side for focusing from infinity to a close distance.

11. An image pickup apparatus comprising:
the optical system according to claim 1, and
an image pickup element that receives light of an image that is formed by the optical system.

12. An optical system consisting of a first lens unit having a positive refractive power that is configured to move to an object side for focusing from infinity to a close distance, wherein:
the first lens unit consists of a first lens sub-unit, an aperture stop, and a second lens sub-unit comprising one or more positive lenses, which are arranged in that order from the object side to an image side; and
the following conditions are satisfied:

$$0.0 < \Delta\theta gFLp,$$

$$0.4 < fLp/f1 < 1.2, \text{ and}$$

$$0.15 < f1b/f1a < 0.60$$

where ΔθgFLp is an extraordinary dispersion characteristic of the material of a positive lens Lp, the positive lens LP being included in the one or more positive lenses included in the second lens sub-unit, the positive lens LP being made of a material having a largest extraordinary dispersion characteristic among extraordinary dispersion characteristics of materials of the one or more positive lenses included in the second lens sub-unit, fLp is a focal length of the positive lens Lp, f1 is a focal length of the first lens unit, f1a is a focal length of the first lens sub-unit, and f1b is a focal length of the second lens sub-unit.

13. An image pickup apparatus comprising:
the optical system according to claim 12, and
an image pickup element that receives light of an image that is formed by the optical system.

14. An optical system consisting of a first lens unit having a positive refractive power that is configured to move to an object side for focusing from infinity to a close distance, and a second lens unit that is moved for focusing from infinity to a close distance, wherein:
the first lens unit consists of a first lens sub-unit, an aperture stop, and a second lens sub-unit comprising one or more positive lenses, which are arranged in that order from the object side to an image side; and:
the following conditions are satisfied:

$$0.0 < \Delta\theta gFLp,$$

$$0.4 < fLp/f1 < 1.2, \text{ and}$$

$$0.15 < f1b/f1a < 0.60$$

where a positive lens ΔθgFLp is an extraordinary dispersion characteristic of the material of the positive lens Lp, the positive lens LP being included in the one or more positive lenses included in the second lens sub-unit, the positive lens LP being made of a material having a largest extraordinary dispersion characteristic among extraordinary dispersion characteristics of materials of the one or more positive lenses included in the second lens sub-unit, fLp is a focal length of the positive lens Lp, f1 is a focal length of the first lens unit, f1a is a focal length of the first lens sub-unit, and f1b is a focal length of the second lens sub-unit.

15. An image pickup apparatus comprising:
the optical system according to claim 14, and
an image pickup element that receives light of an image that is formed by the optical system.

* * * * *